INVENTOR.
NARINDER S. KAPANY
ATTORNEYS

Jan. 16, 1962  N. S. KAPANY  3,016,785
METHOD AND MEANS FOR TRANSMITTING IMAGES THROUGH
A BUNDLE OF TRANSPARENT FIBERS
Filed May 20, 1957  3 Sheets-Sheet 2

Inventor
NARINDER S. KAPANY

By
Attorneys

INVENTOR.
NARINDER S. KAPANY
BY
ATTORNEYS

United States Patent Office 3,016,785
Patented Jan. 16, 1962

3,016,785
METHOD AND MEANS FOR TRANSMITTING IMAGES THROUGH A BUNDLE OF TRANSPARENT FIBERS
Narinder S. Kapany, Rochester, N.Y.
(2126 Greenways Drive, Woodside, Calif.)
Filed May 20, 1957, Ser. No. 660,393
9 Claims. (Cl. 88—1)

The present invention relates to methods and devices for transmitting images and/or information, and more particularly to image transmitting devices which are relatively flexible.

The present invention is based upon the ability of a thin fiber of transparent glass, quartz or plastic to transmit light from one end thereof to the other end by multiple total internal reflections within the fiber. When the fibers are formed or grouped into a bundle and clamped at both ends, each of the fibers isolates an element or extremely small area of an image and conveys it along the entire length of the fiber. The study of the optical characteristics of transparent fibers for the transmission and modification of optical images therethrough is called, quite adequately, "Fiber Optics." It is believed that the theories of this relatively new science are adequately disclosed in various publications of which the present inventor was co-author, appearing in: Optica Acta, No. 4, February 1955, pages 164–170; and Nature, January 2, 1954, pages 39–41. Since this science has been previously publicized, it will be unnecessary to undertake a detailed description thereof in the present application. It is sufficient for purposes of this invention to state that the transmission of elemental or point areas of an image through an optical transparent fiber or strand is accomplished by means of multiple reflections of light rays from the elemental area upon the inner cylindrical surface of the fiber until the rays emerge from the exit end of the fiber so that the image may be seen by the eye or be projected upon a screen.

Generally, the use of flexible fiber bundles for viewing objects with pin point accuracy is limited because the resolving power of the bundle is limited by the fiber diameter. Fair success in increasing the resolving power is brought about by increasing the number of fibers and decreasing the diameter of each fiber to the point where diffraction effects limit their light conductivity. In practice, fiber diameters of between 25µ and 50µ, for example, have produced fairly good results; however, the resolving power is still low for pin point observation of an object. Therefore, it is the principal object of the present invention to provide a flexible transparent light transmitter giving increased resolving power while retaining adequate light transmission.

Another object of the invention is to utilize to the fullest extent the ability of a bundle of fibers to transmit all the information possible with fibers.

Other objects and advantages will be apparent from the following specification when taken in conjunction with the accompanying drawings wherein.

Figure 1:
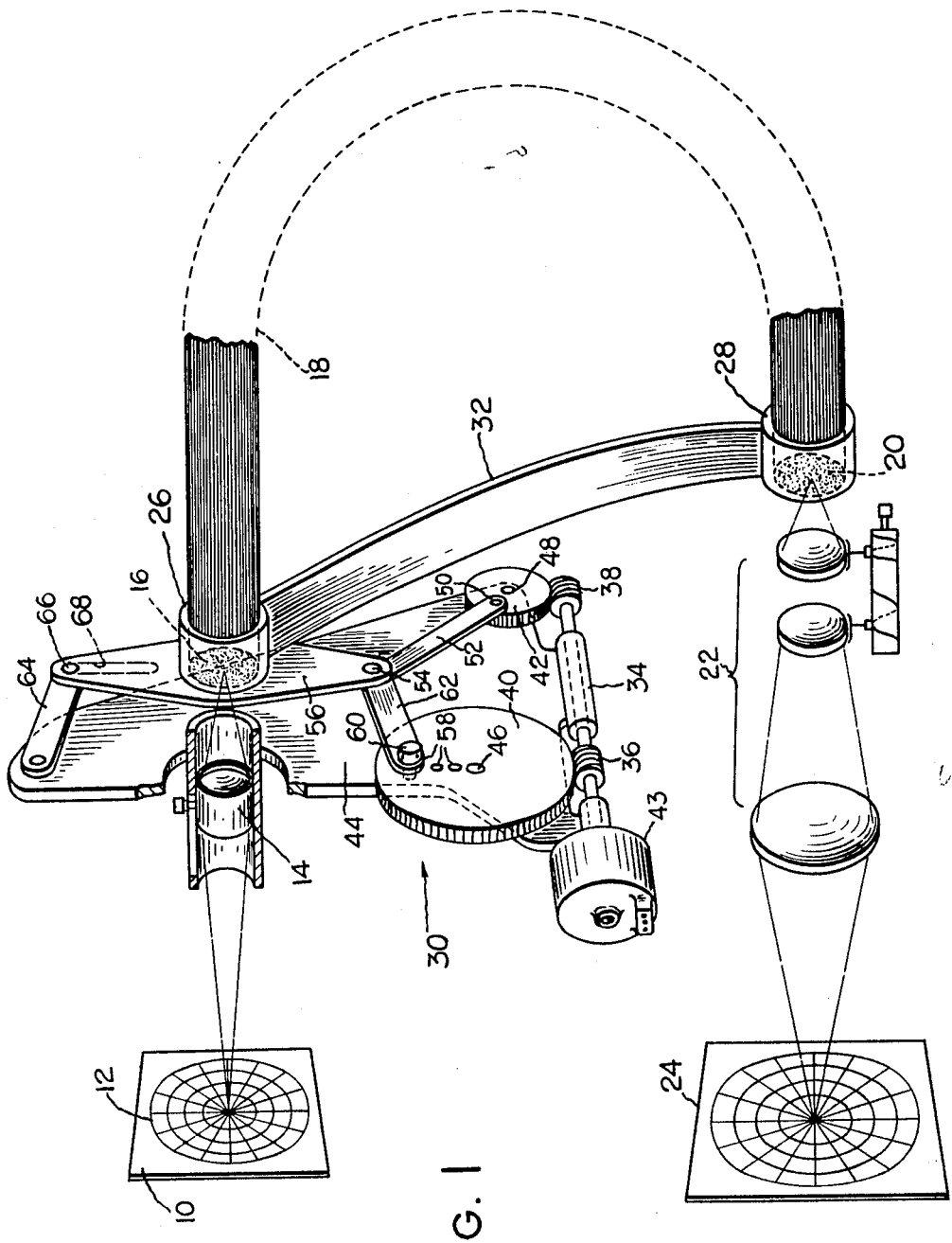
FIG. 1 is a perspective view of a diagrammatic arrangement of the various parts of the preferred embodiment of the present invention.

Referring more particularly to FIG. 1, there is shown a suitable target sheet 10 having imprinted thereon a test design object 12 whose image is to be transmitted around a curved path. A lens 14 is arranged in front of the object 12 for imaging the object upon one end surface 16 of a flexible bundle 18 of fibers or strands composed of optically transparent material such as glass, plastic and the like. The bundle 18 may assume shapes or designs other than the curved design shown in FIG. 1 as well as be extended to any desirable length and formed with any number of fibers without departing from the scope of the invention. This method is also applicable to field flatteners and the like which are essentially stiff bundles.

The individual fibers or strands which go to make up the bundle 18 may be of any suitable length and diameter which will lend flexibility to the bundle as a whole. It has been found that fibers of between 25–150 microns diameter were very successful in the transmission of images, and fibers of between 10–25 microns are most successful if they are insulated. The principles of the present invention are equally applicable to transparent strands having diameters in excess of 150 microns, although strands having diameters of 1 millimeter and greater will be rather stiff.

It has also been found that image transmission is not affected by the amount of normal flexing of a bundle of fibers. It will be quite obvious that over-flexing of the bundle, that is, flexing beyond the elastic and optical limits of the strands will seriously limit transmission, and such flexing is not contemplated herein. Experiments conducted for determining the resolving power of a fiber bundle have revealed that for a given image, the smaller the diameter of the individual fibers, the higher the resolution. However, the maximum resolution available with regard to diameter measurements alone is limited since light cannot be conducted through fibers below a certain level due to diffraction effects becoming excessive and the fibers functioning as wave guides allowing much of the energy conducting through the fibers to escape through the walls.

The light rays focused on or entering the end surface 16 of the bundle 18 are conducted through the bundle and appear upon the other end surface 20 of the bundle. The image at this surface is then projected by a suitable projecting lens 22 upon a screen 24. The screen and projection lens may be replaced by a camera in the event a photographic record of the transmitted image is desired or the image of the object 12 may be viewed directly from the end surface 22 by the human eye or with the aid of suitable magnifying optics. The flexible bundle is formed as a composite unit by a pair of clamps 26, 28, one of which is secured tightly to the bundle adjacent each end surface 16, 20, respectively.

Provision is had for imparting synchronous random or circular motion to the end surfaces 16, 20 and to this end there is provided a motion producing apparatus generally indicated by the reference numeral 30. The apparatus 30 is linked by a suitable mechanical linkage 32 to the clamps 26, 28 for imparting simultaneous random motion to both end surfaces 16, 20, whereby each of the surfaces will experience exactly the same motion both in direction and amplitude.

For producing simultaneous irregular random motion of the surfaces 16 and 20, the motion producing apparatus 30 comprises a drive shaft 34 having spaced longitudinally there along and secured thereto a pair of drive pinions 36, 38, which, in turn, are in mesh with a pair of gears 40, 42, respectively. A suitable motor and gear reduction drive 43 may be utilized for rotating the shaft 34. As shown in FIG. 1, the gear 40 is relatively large in comparison to the gear 42 and both gears are rotatably supported upon a support 44 about parallel axes 46, 48, respectively. The smaller gear 42 is provided with a projecting pin 50 spaced radially from the axis 48 for pivotally supporting one end of a link 52. The other end of this link is pivotally supported on a pin 54 secured to one end of an oblong plate 56 which is integral with the clamp 26. The large gear 40 is provided with a plurality of radially spaced apertures 58 of which the furthermost one has retained therein a pivot pin 60 for pivotally supporting one end of a link 62. The other end of the link 62 is pivotally supported on the pin 54 as is the link 52. To complete the motion apparatus 30, a link 64 is pivotally connected at one end to the support 44 and pivotally connected at the other end by a pivot pin 66 to the plate 56 at a point remote from the pin 54 and in alignment with the pin 54 and the axis of the clamp 26. The plate 56 is preferably formed with a longitudinal slot 68 for receiving and retaining the pivot pin 66 in various positions. Suitable means (not shown) may be utilized for holding the pin 66 at any desired position within the slot, and for purposes of the embodiment of FIG. 1, it is preferred that the pin 66 be held at the upper end of the slot 68.

In operation, if the gears 40, 42 are driven counter-clockwise as viewed in FIG. 1, the plate 56 will at first rotate and then be forced downwardly in a curved path toward the right as the pin 60 and the gear 40 are moved 90° from the position shown since in this position this will occur because of the smaller radius of circular motion of the pin 50 and the greater axial speed of the gear 42, which will cause the pivot 50 to move almost a full half turn about the axis 48. In this position of the parts, the links 52, 62 will be approximately in a straight line and will drive the clamp 26 to its lowermost point. On the other hand, when the pin 60 reaches a position where the axis 46, pin 60 and the pivot 54 are in alignment and the gear 42 has rotated so that the axis 48, pin 50 and the pivot 54 are in alignment, the clamp will have reached its uppermost position. Thus, continuous rotation of the gears 40, 42 will impart random motion to the clamp 26 as well as the clamp 28. The radii of the gears 40, 42 and the positioning of the pivots 50, 60 upon their respective gears will determine the extent of "break-up" of the motion imparted to the ends of the bundle 18. The structure as shown in FIG. 1 has been greatly enlarged in order to bring out the details of the apparatus 30, which, in actual practice, is preferably of a scale so as to impart an amplitude of approximately 4 diameters of an individual fiber to the end surfaces 16, 20 of the bundle 18 and which may be suitably adjusted to produce an amplitude as low as one diameter.

By means of a few adjustments, the apparatus 30 is also capable of imparting circular motion to the end surfaces 16, 20. This may be accomplished by disconnecting the links 52, 62 and directly connecting the plate 56 to one of the apertures 58 and by making the pin 66 freely slidable within the slot 68. The amplitude of motion, either random or circular, may be varied by utilizing gears similar to the gears 40, 42 but of different diameters. Other arrangements for presetting a desired amplitude is to utilize any one of the other apertures 58 for the pivot pin 60; or to shorten or lengthen the links 52, 62.

Figure 2:
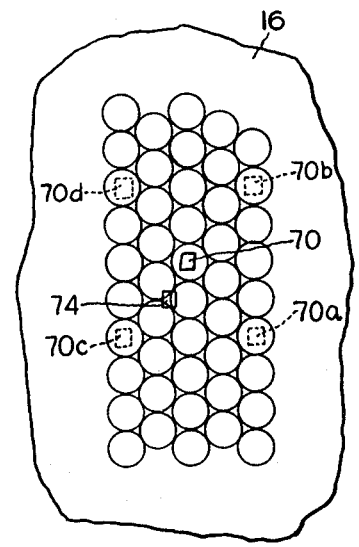
FIG. 2 is a greatly enlarged view of one end surface of a bundle of fibers showing the effect of relative movement between an image and the ends of some of the fibers in the bundle.

By experimentation, it has been found that an amplitude of four or five fiber diameters resulted in considerable gain in resolution for the transmission of images, amplitudes greater than four diameters had no appreciable increase in resolution, and amplitudes of less than four resulted in a proportionate lessening of the resolution which could be measured. In FIG. 2, there is shown, on a greatly enlarged scale, the effect of relative movement between the end surface 16 and the image forming rays emanating from an elemental area of the object 12. An image 70 of an elemental area of the object 12 is shown in various positions in which it may occupy during movement of the end surface 16. Actually, for the embodiment shown in FIG. 1, the elemental image 70 would remain fixed and the end surface 16 would be moved in order to produce the pattern effect shown in FIG. 2. The maximum distance between any two extreme positions that the image 70 should occupy is approximately equal to the distance of four diameters of an individual fiber, therefore in moving from position 70a to 70b, the image 70 would traverse the end of four fibers. Similarly, in moving from position 70c to 70d, or from 70a to 70c or from 70b to 70d, the distance in which the image 70 moves approximates the distance of four fiber diameters.

Figure 3:
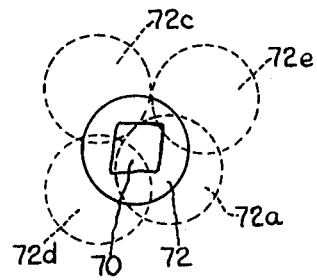
FIG. 3 is a greatly enlarged view of one end of one fiber and its relationship with respect to an elemental area of an object.

In FIG. 3, the elemental area 70 is shown being viewed by a single fiber 72 of the bundle 18 during movement of the fiber. If the image 70 is located within the confines of the circumference of the end of the fiber 72, all of the information of the image will be transmitted by the fiber. However, if there was no relative motion between the image 70 and the end surfaces 16, 20 of the bundle and if the image is located between two or three fibers, as shown by the numeral 74 in FIG. 2, only that information located within the confines of each of the fibers immediately adjacent the image will be transmitted. The portions of the image 74 between these fibers are not transmitted through the bundle resulting in a loss of information and resolution of the image. By having the fiber 72 move about in various positions 72a, 72b, 72c, 72d with respect to the image 70, as shown in FIG. 3, most of the information of the image is transmitted and those positions of each elemental image which would normally lie between the fiber ends if no motion was imparted thereto will also be transmitted, thereby producing on the exit surface 20 an integrated image of high resolution with more information. The effect of moving the exit surface 20 is to eliminate the pattern effect of the image appearing at that surface and caused by the viewing of the ends of the fibers at that surface.

As previously stated, the resolution of a bundle of fibers is a function of the diameters of the individual fibers and that the lessening of the diameters will proportionately increase the resolution. However, gaining of resolution in this manner is limited, since the transmission of images through fibers of extremely small diameters is nil. Resolution is increased in another way by the use of the apparatus 30 which, when it is set to produce motion having an amplitude of approximately four or more fiber diameters, will increase the resolution of the bundle two times over that in static condition or that condition when the end surfaces 16, 20 are held immobile with respect to the image forming light rays emanating or emerging from the surfaces, as the case may be. It has also been found that the random movement of the end surfaces 16, 20, in the embodiment of FIG. 1, must be simultaneous and of the same direction and amplitude, in other words, the motions must be identical in order to acquire the maximum possible resolution of this method. In the event that a bundle of rigid fibers is utilized or the bundle of flexible fibers is extended so that the fibers are in longitudinal alignment and parallel, the random or circular motion may be imparted to the bundle as a whole rather than to its ends.

Figure 4:
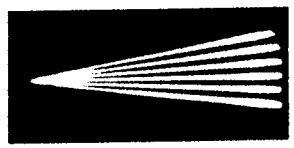
FIGS. 4 and 5 are photolithographic reproductions of photographs of two test objects.
Figure 6:
FIGS. 6 and 7 are photolithographic reproductions of photographs of the corresponding images of the objects shown in FIGS. 4 and 5, respectively, and transmitted by a bundle of fibers under prior art methods.
Figure 8:
FIGS. 8 and 9 are photolithographic reproductions of photographs of the corresponding images of the objects shown in FIGS. 4 and 5, respectively, and transmitted by a bundle of fibers in accordance with the present invention.
Figure 5:
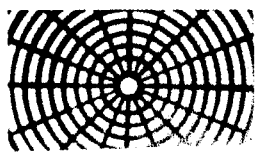
Figure 7:
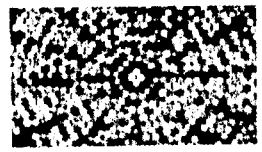
Figure 9:
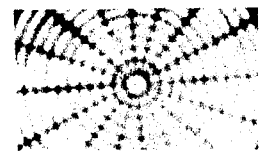

In order to more fully understand and appreciate this principle of increasing image resolution and information, there are shown in FIGS. 4–9 photolithographs of various photographs taken during experimental tests with an arrangement similar to that shown in FIG. 1. A camera was substituted for the projection lens and screen, and, in one stage of the tests, the end surfaces 16, 20 were held rigid while in another stage of operations, motion was imparted to the end surfaces in accordance with the principles of the present invention. The photolithographs of FIGS. 4 and 5 show a fan design and a spider web design, respectively, used as test objects. FIG. 6 shows the fan design image which was transmitted through the bundle 18 when in static condition. Similarly, FIG. 7 shows the image of the spider web design as transmitted through the bundle when the latter was held immobile. In both FIGS. 6 and 7 the images of the designs appear to be spurious chain structures which result when the fibers are unable to pick up most of the elemental areas of the respective test designs. FIGS. 8 and 9 show the two object designs as transmitted through the bundle when the end surfaces 16, 20 were undergoing random motion of approximately four fiber diameters amplitude. Upon inspecting FIGS. 6–9, it is quite apparent that the images which are transmitted while imparting random motion to the end surfaces of the bundle are greatly improved over those transmitted when the ends of the bundles are static. In fact, the resolution and the transmitted information of the images of FIGS. 6 and 7 are very low while those of the images in FIGS. 8 and 9 are rather high, at least two times as high as the images of FIGS. 6 and 7. It was found that this relationship exists for any diameter of the individual fibers, regardless of whether the bundle is curved such as shown in FIG. 1, or is extended so that the end surfaces are held in axial alignment.

Since this increase in resolution is produced by the random movement of the end surfaces of the bundle with respect to the image forming light rays immediately adjacent thereto, any other suitable means for effecting this motion may be utilized instead of directly moving the end surfaces themselves, as shown in FIG. 1. As previously described with reference to FIG. 2, the motion need only be effected between the image forming light rays which enter the surface 16 and the surface itself, and the image forming light rays emanating from the exit surface 20.

Figure 10:
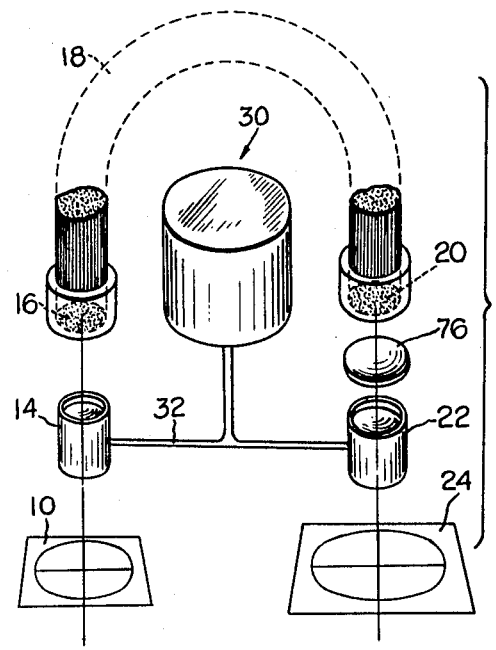
FIGS. 10, 11 and 12 are perspective views of modifications of the present invention.

In the embodiment of FIG. 10, the linkage 32 is directly connected to the focusing lens element 14 and the projection lens 22 and in this embodiment and for those which will be described hereinafter, the end surfaces 16, 20 are held immobile and the element image 70 is made to move with respect to the end surface 16. With these arrangements, the transmitted image appearing on the exit surface 20 will move in accordance with the movement of the image upon the surface of the entry and surface 16, except that the image movements on the exit surface 20 will be reversed with respect to the corresponding image on the entry surface 16. In order to compensate for this reversal of movement, an erecting lens 76 is positioned adjacent the exit surface 20 for erecting the image formed thereon. The movement of the projection lens 22 in synchronism with the movement of the element 14 serves to compensate for the movement of the erected image thereby resulting in a still image of the object 12 upon the screen 24.

The same result may be accomplished by arranging the apparatus 30 and linkage 32 so that the movement of the projection lens 22 will be equal but opposite to the movement of the focusing element 14. In this arrangement the erecting lens 76 is eliminated since the oppositely moving projection lens will also erect the image.

Figure 11:
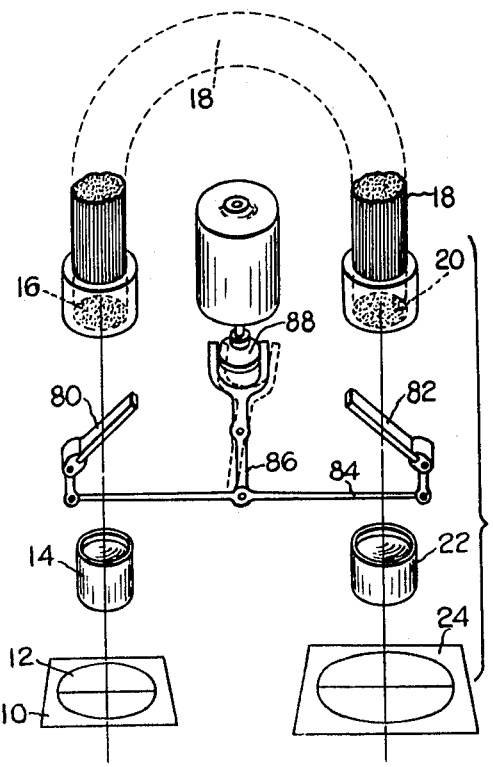

In the embodiment of FIG. 11, a clear glass blank 80 having opposed surfaces in parallel is pivotally mounted between the focusing lens element 14 and the entry surface of the bundle 18. A similar glass blank 82 is pivotally mounted between the exit surface of the bundle 18 and the projection lens 22. A linkage 84 is connected between the blanks 80, 82 for rotating the same in equal but opposite directions when the linkage is reciprocated horizontally.

The linkage 84 is pivotally connected at its mid-point to one end of a lever 86 which in turn is adapted to pivot about a point intermediate the ends thereof. A motor driven cam 88 serves to periodically rock the lever 86 for imparting reciprocatory motion to the linkage 84. In this embodiment, the image forming rays of the object 12 are transmitted through the blank 80 and the image forming rays emanating from the exit surface 20 are transmitted through the blank 82. Rotation of the blank 80 in one direction with respect to the light rays from the object 12 will bend the rays and cause imaging of the object upon the entry end surface 16 at a point above or below that which it would normally occupy. Reverse rotation of the blank will cause the image to move in the opposite direction and repeated rotation of the blank in opposite directions will correspondingly move the image with respect to the end surface of the bundle. The repeated rotation of the blank 82 in opposite directions and in opposed motion with respect to the blank 80 will stabilize the moving image appearing at the exit surface 20 of the bundle and permit a still reproduction of the image upon the screen 24.

It will be noted that the reciprocation of the linkage 84 will produce reciprocatory movement of the image upon the entry surface 16 rather than random or circular movement as described for the embodiments of FIGS. 1 and 10. This vertical reciprocatory movement will, nevertheless, result in an improved image over that produced if the image rays or the bundle ends were held immobile or in static condition. The blanks 80, 82 could be easily mounted on universal pivots and a random or circular motion apparatus, such as that disclosed in FIG. 10, could be utilized to impart random or circular motion to the blanks. Mirrors may be substituted for the blanks 80, 82 in the event the object 12 and the screen 24 are located at angles with respect to the end surfaces 16, 20, respectively. In this arrangement, rocking of the mirrors would produce the same results as corresponding movements of the blanks 80, 82.

Figure 12:
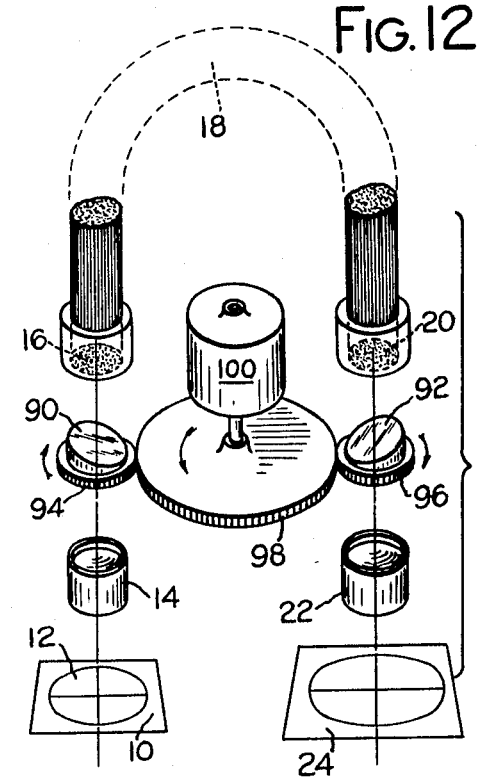

In the embodiment of FIG. 12, a deviation prism 90 preferably of circular configuration is interposed between the entry surface 16 and the focusing lens element 14 and a similar deviation prism 92 is interposed between the projection lens 22 and the exit surface 20. The prisms 90, 92 are mounted on ring gears 94, 96, respectively, and these are spaced, in mesh engagement, on either sides of a drive gear 98 which in turn is suitably driven by a motor and gear reduction device 100. It will be apparent that rotation of the gear 98 will rotate the gears 94, 96 in the same direction. However, it will be noted that the prisms 90, 92 are positioned to cause bending of the light rays therethrough in opposite directions upon rotation. In this manner, the movement of the image formed on the exit surface 20 and caused by the movement of the prism 90 will be that picked up and stabilized by the prism 92 thereby permitting a still image of the object 12 upon the screen 24. It will also be apparent that the rotation of the gear 94 will produce circular motion of the image forming light rays upon the entry surface 16 and, of course, on the exit surface 20. If random motion is desired between these light rays and the end surfaces, suitable odd-shaped gears may be employed in place of the gears 94, 96 and 98 and their pivots may be arranged in slots for imparting a "break-up" motion to the prisms 90, 92.

In summary, there has been disclosed one preferred form and three modifications of the present invention which reside in the imparting of relative motion between one end of a bundle of transparent fibers and the image forming light rays emanating from the object. The motion is such as to repeatedly cause the ends of the fibers to traverse the light rays thereby improving the image transmitted to an image receiving surface. This is accomplished in the preferred embodiment by physically moving the ends of the bundle, while in the other embodiments, the image light rays are made to move with respect to the entry end surfaces of the fibers. The motion generating apparatus utilized in each of the various disclosed embodiments is designed to impart motion to the respective movable elements in a plane parallel to the adjacent end surface of the bundle. Being random or circular motion, or combinations thereof, the motion of the element has components lying in a plurality of direction, since the light rays are repeatedly traversed by the ends of the fibers.

While the transmission of light rays has been specifically described in the operation of the present invention, it will be understood that the present invention is equally adapted, under the principles outlined above, to transmit other radiating rays having different wave lengths, instead of light rays, such for example, as infrared and ultraviolet radiations.

From the foregoing description, it will be appreciated that the present invention provides means for improving the efficiency of information transfer and the resolution of an image transmitted through a bundle of fibers of flexible or rigid construction. The improved image has increased resolution and is more informative than that which would result if the bundle of fibers viewed the object in static condition. While there is in the application specifically described one preferred embodiment and three modifications thereof, it will be understood that these forms are shown for the purpose of illustration, and that the same may be modified and embodied in various other forms or employed in other uses without departing from the spirit or the scope of the appended claims.

I claim:

1. In the art of transmitting an image of an object through a flexible bundle of transparent fibers and onto an image receiving surface, the steps of producing continuous relative irregular and random motion having components lying in at least two different directions, in the same plane and an amplitude of approximately four diameters of an individual fiber between one end surface of the bundle and the image forming light rays emanating from the object and entering said end surface whereby the faces of each of said fibers at said one end surface scan, respectively, the elemental areas positioned in a plane of origin of said image forming light rays, and simultaneously producing the same relative motion between the other end surface of the bundle and the image forming light rays emanating from said other end surface of the bundle whereby the pattern effect produced by the fibers in the transmitted image is substantially eliminated.

2. In the art of transmitting an image of an object through a flexible bundle of transparent fibers and onto an image receiving surface, the steps of imparting continuous motion to the end surface of the bundle which receives the image forming light rays emanating from the object whereby the faces of each of said fibers at said one end surface scan, respectively, the elemental areas positioned in a plane of origin of said image forming light rays, and simultaneously imparting the same motion to the other end surface of the bundle whereby the pattern effect produced by the fibers in the transmitted image is substantially eliminated.

3. An apparatus for transmitting the image of an object comprising a flexible bundle of fibers made of transparent material, said bundle having one end surface constructed and arranged to receive image forming light rays emanating from the object, said bundle having another end surface constructed and arranged to project the image forming light rays emanating from said object, means for imparting continuous motion to said one end surface in a plane which traverses the path of the light rays for establishing relative motion between said one end surface and said image forming light rays which enter said one end surface whereby the faces of each of said fibers at said one end surface scan, respectively, the elemental areas positioned in a plane of origin of said image forming light rays, and means for imparting the same motion to the other end surface of said bundle whereby the pattern effect produced by the fibers in the transmitted image is substantially eliminated.

4. An apparatus for transmitting the image of an object comprising a flexible bundle of fibers made of transparent material, said bundle having one end surface constructed and arranged to receive image forming light rays emanating from the object, said bundle having another end surface constructed and arranged to project the image forming light rays emanating from said object, means for imparting continuous motion having an amplitude of approximately four diameters of an individual fiber to said one end surface in a plane which traverses the path of the light rays for establishing relative motion between said one end surface and said image forming light rays which enter said one end surface whereby the faces of each of said fibers at said one end surface scan, respectively, the elemental areas positioned in a plane of origin of said image forming light rays, and means for imparting the same motion to the other end surface whereby the pattern effect produced by the fibers in the transmitted image is substantially eliminated.

5. In the art of transmitting an image of an object through a flexible bundle of transparent fibers and on to an image receiving surface, the steps of producing continuous relative non-linear motion between one end surface of the bundle of fibers and the image forming light rays emanating from the object and entering said end surface to cause the faces of a plurality of fibers to selectively, alternately, and continuously traverse the light rays emanating from an elemental area from the object to said faces, said continuous relative motion simultaneously producing the same relative motion between the other end surfaces of said bundle of fibers and the light rays emanating from the image from said other end surface whereby the pattern effect produced by the fibers in the transmitted image is substantially eliminated.

6. The method of improving the clarity of an image translated through a coherent bundle of fibers comprising, producing relative motion between the entrant end of said bundle of fibers and a stationary image being stationary with the object forming the image so as to selectively and alternatively provide a plurality of light transmitting fibers for light transmitted from each elemental area of the image, said motion being a planar motion perpendicular to the direction of image translation at said entrant end, and producing relative motion synchronously with said first named motion between the exit end of said bundle of fibers and the exit stationary image emergent therefrom.

7. A method of improving the clarity of the image translated through a coherent bundle of fibers comprising moving the entrant end surface of said bundle of fibers relative to the image to be translated through a plane coincidental with the image plane with a repetitive random motion of the order of magnitude of approximately four diameters of individual fibers to provide a plurality of selectively alternative paths for each elemental area of said image, and moving the exit end surface of said bundle synchronously with said entrant end surface through the plane of the image of said exit end surface of said bundle of fibers.

8. A method of improving the clarity of an image translated through a coherent bundle of fibers comprising, moving the image to be translated relative to the entrant end of said bundle of fibers with a random planar motion in a plane perpendicular to the direction of the image translation at said entrant end to provide a plurality of paths for light transmitted from each elemental area of the image through alternate of said fibers, and synchronously similarly moving the exit end image at the emergent end of said bundle with the entrant end image to provide clarity of image translatetd through said bundle of fibers.

9. An image translating device comprising, a coherent bundle of fibers, means for producing a light image on one end surface of said bundle, means producing a relative and cycling motion between said one end of said bundle and the image thereof in the plane of the image and of the order of magnitude of the diameter of at least one of said fibers, and means producing similar relative motion between the end of said bundle opposite from said one end and the light image emergent therefrom and so providing a plurality of paths for light transmitted through selectively alternative fibers from elemental areas of said first mentioned image to corresponding elemental areas of said second mentioned image whereby the clarity of the translated image as viewed at said opposite end of said bundle is better than the clarity of an image translated through said bundle in the absence of said motion.

References Cited in the file of this patent

UNITED STATES PATENTS

| | | |
|---|---|---|
| 1,751,584 | Hansell | Mar. 25, 1930 |
| 2,198,115 | John | Apr. 23, 1940 |
| 2,250,730 | Stewart et al. | July 29, 1941 |
| 2,294,643 | Wurzburg | Sept. 1, 1942 |
| 2,588,373 | Erban | Mar. 11, 1952 |
| 2,825,260 | O'Brien | Mar. 4, 1958 |

FOREIGN PATENTS

| | | |
|---|---|---|
| 394,285 | Great Britain | June 22, 1933 |